United States Patent
Kang et al.

(10) Patent No.: US 10,628,947 B2
(45) Date of Patent: Apr. 21, 2020

(54) METHOD AND APPARATUS FOR TRACKING EYES OF USER AND METHOD OF GENERATING INVERSE-TRANSFORM IMAGE

(71) Applicant: SAMSUNG ELECTRONICS CO., LTD., Suwon-si (KR)

(72) Inventors: Dongwoo Kang, Seoul (KR); Jingu Heo, Yongin-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 15/810,730

(22) Filed: Nov. 13, 2017

(65) Prior Publication Data
US 2018/0144483 A1    May 24, 2018

(30) Foreign Application Priority Data
Nov. 22, 2016  (KR) .................. 10-2016-0155600

(51) Int. Cl.
*G06K 9/00* (2006.01)
*G06T 7/246* (2017.01)
(Continued)

(52) U.S. Cl.
CPC .............. *G06T 7/248* (2017.01); *G01S 3/00* (2013.01); *G06F 3/013* (2013.01); *G06K 9/0061* (2013.01); *G06K 9/00604* (2013.01); *G06K 9/4642* (2013.01); *G06K 9/4661* (2013.01); *G06K 9/6232* (2013.01); *G06K 9/6256* (2013.01); *G06T 5/40* (2013.01); *G06T 7/20* (2013.01); *G06T 7/74* (2017.01); *H04N 5/232* (2013.01);
(Continued)

(58) Field of Classification Search
CPC .. G06T 7/248; G06T 7/74; G06T 5/40; G06T 7/20; G06T 2207/10152; G06T 2207/20081; G06T 2207/30201; H04N 13/366; H04N 5/232; H04N 5/2351; G01S 3/00; G06F 3/013; G06K 9/00604; G06K 9/0061; G06K 9/4642; G06K 9/4661; G06K 9/6232; G06K 9/6256; G06K 9/54
See application file for complete search history.

(56) References Cited

U.S. PATENT DOCUMENTS

| | | | |
|---|---|---|---|
| 6,249,601 B1 * | 6/2001 | Kim | G01J 3/46 348/E9.052 |
| 9,498,125 B2 * | 11/2016 | Caraffi | A61B 3/113 |
| 2006/0210124 A1 * | 9/2006 | Ishii | G06K 9/00255 382/118 |
| 2014/0105504 A1 | 4/2014 | Krupka et al. | |

(Continued)

FOREIGN PATENT DOCUMENTS

| | | |
|---|---|---|
| JP | 2000-90191 A | 3/2000 |
| JP | 2008-538425 A | 10/2008 |

(Continued)

*Primary Examiner* — Shefali D Goradia
(74) *Attorney, Agent, or Firm* — Sughrue Mion, PLLC

(57) ABSTRACT

There is provided a method and apparatus for tracking eyes of a user. The method and apparatus may acquire an image of the user, acquire an illuminance of a viewpoint from which the image is captured, and output coordinates of the eyes tracked from the image by operating at least one of a high illuminance eye tracker that operates at a high illuminance or a low illuminance eye tracker that operates at a low illuminance based on the acquired illuminance.

23 Claims, 7 Drawing Sheets

(51) Int. Cl.
*H04N 5/232* (2006.01)
*H04N 13/366* (2018.01)
*G06K 9/46* (2006.01)
*G01S 3/00* (2006.01)
*G06T 7/20* (2017.01)
*G06T 7/73* (2017.01)
*G06F 3/01* (2006.01)
*G06K 9/62* (2006.01)
*G06T 5/40* (2006.01)
*H04N 5/235* (2006.01)
*G06K 9/54* (2006.01)

(52) U.S. Cl.
CPC ......... *H04N 5/2351* (2013.01); *H04N 13/366* (2018.05); *G06K 9/54* (2013.01); *G06T 2207/10152* (2013.01); *G06T 2207/20081* (2013.01); *G06T 2207/30201* (2013.01)

(56) References Cited

U.S. PATENT DOCUMENTS

| | | | |
|---|---|---|---|
| 2016/0011565 A1* | 1/2016 | Sung | G03H 1/0808 359/9 |
| 2016/0066781 A1 | 3/2016 | Thompson et al. | |
| 2016/0117699 A1* | 4/2016 | Tanabe | G06Q 30/02 705/7.32 |
| 2016/0196465 A1 | 7/2016 | Wu et al. | |
| 2016/0231811 A1 | 8/2016 | Elvesjö et al. | |

FOREIGN PATENT DOCUMENTS

| | | |
|---|---|---|
| JP | 2016-515431 A | 5/2016 |
| KR | 10-2013-0088666 A | 8/2013 |
| KR | 10-2015-0014290 A | 2/2015 |
| KR | 10-2016-0047196 A | 5/2016 |
| KR | 10-2016-0074388 A | 6/2016 |

\* cited by examiner

FIG. 4
410
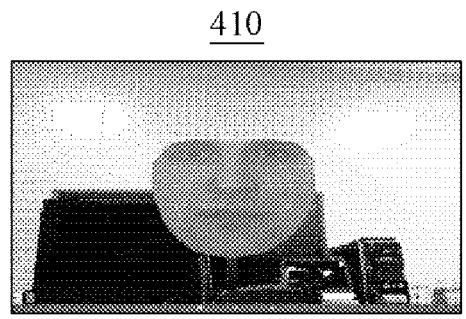
415
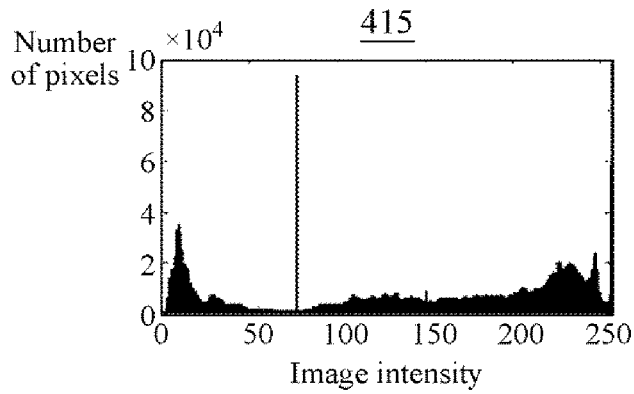
420
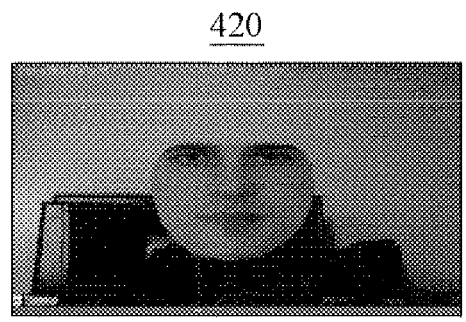
425
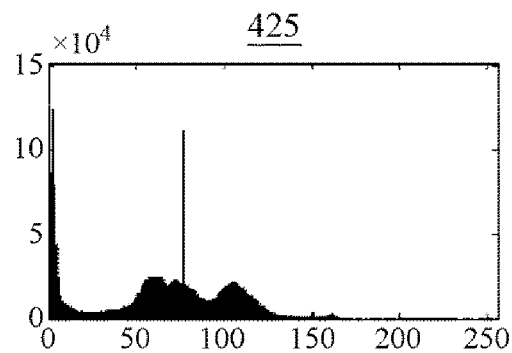
430
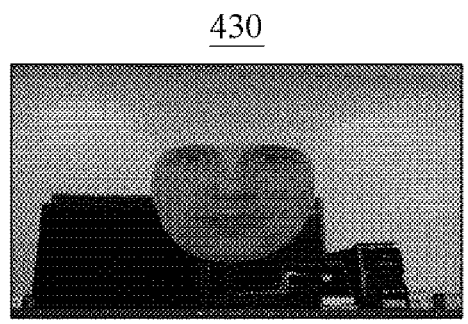
435
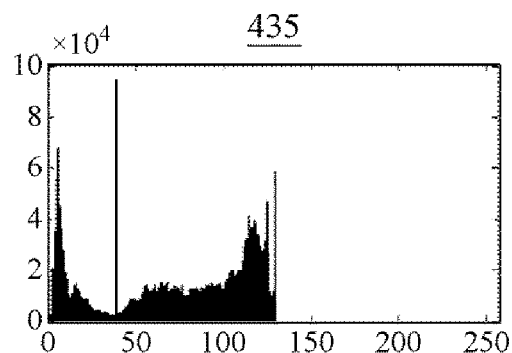
440
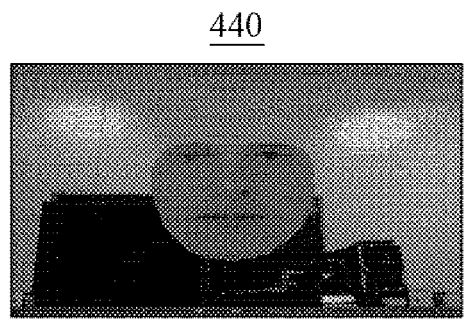
445
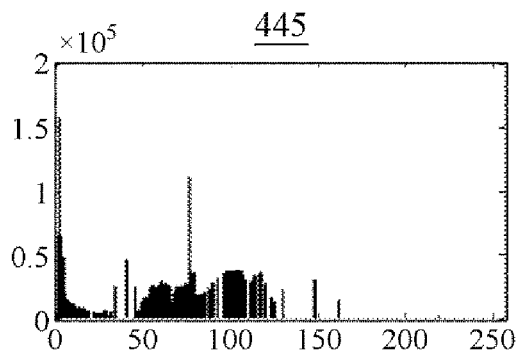

600

METHOD AND APPARATUS FOR TRACKING EYES OF USER AND METHOD OF GENERATING INVERSE-TRANSFORM IMAGE

CROSS-REFERENCE TO RELATED APPLICATION

This application claims priority from Korean Patent Application No. 10-2016-0155600, filed on Nov. 22, 2016, in the Korean Intellectual Property Office, the disclosure of which is incorporated herein by reference in its entirety.

BACKGROUND

1. Field

Methods and apparatuses consistent with exemplary embodiments in this disclosure relate to a method and an apparatus for tracking eyes of a user, and more particularly, to a method of generating an inverse-transform image and an apparatus for generating an inverse-transform image.

2. Description of the Related Art

Related art camera-based eye tracking technology may be utilized in many fields, such as an ultra multi-view glasses-free three-dimensional (3D) display based on viewpoint tracking. The ultra multi-view glasses-free three-dimensional (3D) display may be used in a low lighted area (dark location) as well as a well-lit area (bright location), while watching a television (TV) or using a mobile device. However, while the related art camera-based eye tracker may properly operate in a high illuminance environment (for example, 400 lux), the related art camera-based eye tracker may not properly operate in a low illuminance environment due to a low quality of a camera image.

Also, in a next generation 3D head-up display (HUD) technology for vehicles, night driving may need to be taken into consideration. Accordingly, there is a desire for an eye tracker that properly operates at a low illuminance.

SUMMARY

Exemplary embodiments may address at least the above problems and/or disadvantages and other disadvantages not described above. Also, the exemplary embodiments are not required to overcome the disadvantages described above, and an example embodiment may not overcome any of the problems described above.

According to an aspect of an exemplary embodiment, there is provided a method of tracking eyes of an object, the method may comprise: acquiring an image of the object, acquiring an illuminance of a viewpoint from which the image is captured and outputting coordinates of the eyes tracked from the image by operating at least one of a first illuminance eye tracker that operates at a first illuminance range or a second illuminance eye tracker that operates at a second illuminance range based on the acquired illuminance.

The first illuminance eye tracker may be trained by machine learning based on a first illuminance database (DB) comprising first illuminance images captured at the first illuminance range, and the second illuminance eye tracker may be trained by machine learning based on a second illuminance DB comprising inverse-transform images obtained by inversely transforming the first illuminance images into second illuminance images.

The inverse-transform images may comprise feature points trained by the machine learning based on the first illuminance DB.

The second illuminance DB may comprise the inverse-transform images generated by applying, to the first illuminance images, an image histogram characteristic of a second illuminance reference image modeled in advance based on second illuminance images captured at a second illuminance range.

The second illuminance DB may comprise the inverse-transform images generated by applying, to the first illuminance images, a noise component of the second illuminance reference image in addition to the image histogram characteristic.

Each of the first illuminance eye tracker and the second illuminance eye tracker may comprise a plurality of classifiers configured to recognize feature points corresponding to eyes of the object from the image.

The outputting of the coordinates may comprise comparing the acquired illuminance to a preset reference value, outputting the coordinates by operating the second illuminance eye tracker when the acquired illuminance is less than or equal to the reference value and outputting the coordinates by operating the first illuminance eye tracker when the acquired illuminance is greater than the reference value.

The reference value may be set to 10 lux.

The acquiring of the image may comprise capturing the image using a single image sensor.

According to an aspect of another embodiment, there is provided a method of generating an inverse-transform image, the method may comprise: modeling a first illuminance reference image based on first illuminance images captured at a first illuminance, acquiring an image histogram characteristic of the first illuminance reference image, generating a intermediate image by adjusting a brightness level in an image histogram of a second illuminance image captured at a second illuminance and inversely transforming the intermediate image into a first illuminance image by applying the image histogram characteristic to the intermediate image.

The method may further comprise acquiring a noise component of the first illuminance reference image.

The inversely transforming of the intermediate image may comprise inversely transforming the intermediate image into the first illuminance image by applying the noise component and the image histogram characteristic to the intermediate image.

The noise component may comprise at least one of Gaussian noise of the illuminance reference image or Poisson noise of the first illuminance reference image.

According to an aspect of another embodiment, there is provided a non-transitory computer-readable storage medium storing a program for causing a processor to perform the method of generating an inverse-transform image, the method may comprise: modeling a first illuminance reference image based on first illuminance images captured at a first illuminance, acquiring an image histogram characteristic of the first illuminance reference image, generating a intermediate image by adjusting a brightness level in an image histogram of a second illuminance image captured at a second illuminance and inversely transforming the intermediate image into a first illuminance image by applying the image histogram characteristic to the intermediate image.

According to an aspect of another embodiment, there is provided an apparatus for tracking eye of an object, the apparatus may comprise an image sensor configured to capture an image of the object, an illuminance sensor configured to measure an illuminance of a viewpoint from which the image is captured, a first illuminance eye tracker configured to operate at a first illuminance range, a second illuminance eye tracker configured to operate at a second illuminance range and a processor configured to control coordinates of the eyes tracked from the image to be output by operating at least one of the first illuminance eye tracker or the second illuminance eye tracker based on the measured illuminance.

The first illuminance eye tracker may be trained by machine learning based on a first illuminance database (DB) comprising first illuminance images captured at the first illuminance range, and the second illuminance eye tracker may be trained by machine learning based on a second illuminance DB comprising inverse-transform images obtained by inversely transforming the first illuminance images into second illuminance images.

The second illuminance DB may comprise the inverse-transform images generated by applying, to the first illuminance images, an image histogram characteristic of a second illuminance reference image modeled in advance based on second illuminance images captured at a second illuminance range.

The illuminance DB may comprise the inverse-transform images generated by applying, to the first illuminance images, a noise component of the second illuminance reference image in addition to the image histogram characteristic.

According to an aspect of another embodiment, there is provided an illuminance eye tracker comprising: a illuminance database (DB) comprising inverse-transform images obtained by inversely transforming first illuminance images into second illuminance images; and an image processor configured to process a second illuminance image of an object by a parameter trained by machine learning based on the illuminance DB, and to output coordinates of eyes of the object.

The illuminance DB may comprise the inverse-transform images generated by applying, to the first illuminance images, an image histogram characteristic of a second illuminance reference image modeled in advance based on second illuminance images captured at a second illuminance range.

The illuminance DB may comprise the inverse-transform images generated by applying, to the first illuminance images, a noise component of the second illuminance reference image in addition to the image histogram characteristic.

BRIEF DESCRIPTION OF THE DRAWINGS

The above and other aspects of exemplary embodiments will become apparent and more readily appreciated from the following detailed description of certain example embodiments, with reference to the accompanying drawings of which:

FIG. 4 is a diagram illustrating a method of generating an inverse-transform image according to an exemplary embodiment;

DETAILED DESCRIPTION

Figure 1:
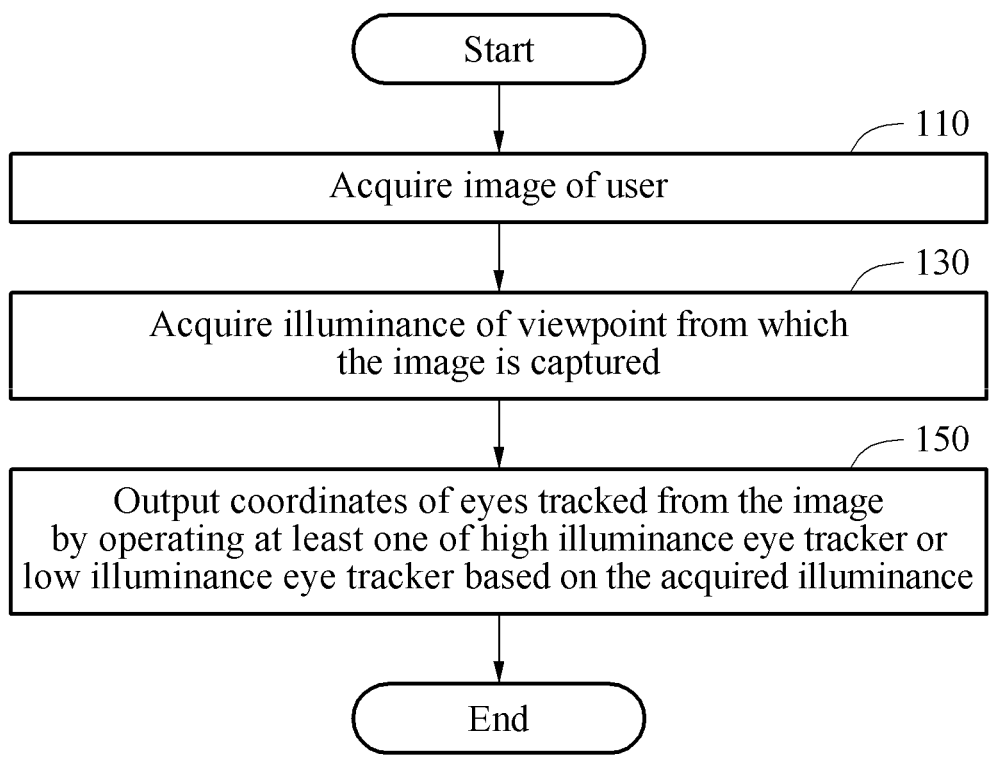
FIG. 1 is a flowchart illustrating a method of tracking eyes of a user according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

In the following description, exemplary embodiments may describe methods and apparatuses used to track eyes of a user and output coordinates of the eyes when a glasses-free three-dimensional (3D) monitor, a glasses-free 3D tablet and/or smartphone, or a 3D head-up display (HUD) for vehicles is used in a dark environment with a relatively low illuminance. Also, exemplary embodiments may be implemented as, for example, a software algorithm in a chip or a hardware processor in a monitor, or an application in a tablet and/or smartphone, and may be implemented as a hardware eye tracking apparatus. For example, example embodiments may be applicable to an autonomous vehicle, an intelligent vehicle, a smartphone or a mobile device. Hereinafter, exemplary embodiments will be described in detail below with reference to the accompanying drawings, and like reference numerals refer to the like elements throughout.

FIG. 1 is a flowchart illustrating a method of tracking eyes of a user according to an exemplary embodiment. Referring to FIG. 1, in operation 110, an apparatus for tracking eyes of a user (hereinafter, referred to as a "tracking apparatus") according to an exemplary embodiment acquires an image of the user. The image may include, for example, a face image of the user or a body image including a face of the user.

According to an exemplary embodiment, the tracking apparatus may acquire an image of a user that is directly captured by an image sensor or an imaging device included in the tracking apparatus. The tracking apparatus may capture an image of a user using a single imaging device or a single image sensor. Also, the tracking apparatus may receive an image of a user captured outside the tracking apparatus. The image sensor may include, for example, a complementary metal-oxide-semiconductor (CMOS) image sensor or a vision sensor.

In operation 130, the tracking apparatus acquires an illuminance of a viewpoint from which the image is captured. For example, the tracking apparatus may acquire an illuminance sensed by an imaging device that captures the image and/or an illuminance sensed at a location of the user. Also, the tracking apparatus may sense an illuminance by an illuminance sensor included in the tracking apparatus, or may receive a sensing result from a separate illuminance sensor outside the tracking apparatus.

In operation 150, the tracking apparatus outputs coordinates of the eyes tracked from the image by operating at least one of a high illuminance eye tracker or a low illuminance eye tracker based on the acquired illuminance. The high illuminance eye tracker may operate at a high illuminance, and the low illuminance eye tracker may operate at a low illuminance. Each of the high illuminance eye tracker and the low illuminance eye tracker may include a plurality of classifiers configured to recognize feature points corresponding to the eyes from the image.

A classifier may recognize landmarks, that is, feature points corresponding to eyes and a nose of a user from a face area of an image of the user using, for example, an active shape model (ASM) scheme, an active appearance model (AAM) scheme or a supervised descent method (SDM).

According to another embodiment, the tracking apparatus may include a plurality of classifiers configured to recognize other feature points in the image, i.e., landmarks other than eyes and a nose from the image for tracking.

For example, the high illuminance eye tracker may track eyes of a user by classifiers pre-trained to recognize feature points corresponding to the eyes and a nose of the user based on the eyes from a face of the user, and may output coordinates of the eyes. According to an exemplary embodiment, the feature points acquired by the high illuminance eye tracker may be used and trained for a low illuminance image obtained by inversely transforming a high illuminance image. The feature points acquired by the high illuminance eye tracker may be used and trained without a change for a low illuminance image obtained by inversely transforming a high illuminance image. In the present disclosure, a low illuminance image obtained by inversely transforming a high illuminance image may be referred to as an "inverse-transform image." Inverse-transform images included in a low illuminance database (DB) may include the same feature points as those trained by machine learning based on a high illuminance DB.

For example, machine learning may be performed by, for example, an adaptive boosting (AdaBoost) or a support vector machine (SVM) scheme, however, there is no limitation thereto. Accordingly, various learning methods may be applied.

The low illuminance DB may include inverse-transform images generated by applying, to high illuminance images, an image histogram characteristic of a low illuminance reference image modeled in advance based on low illuminance images captured at a low illuminance. Also, the low illuminance DB may include inverse-transform images generated by applying, to high illuminance images, a noise component of the low illuminance reference image in addition to the image histogram characteristic.

Hereinafter, an example of operation 150 will be further described with reference to FIG. 2.

Figure 2:
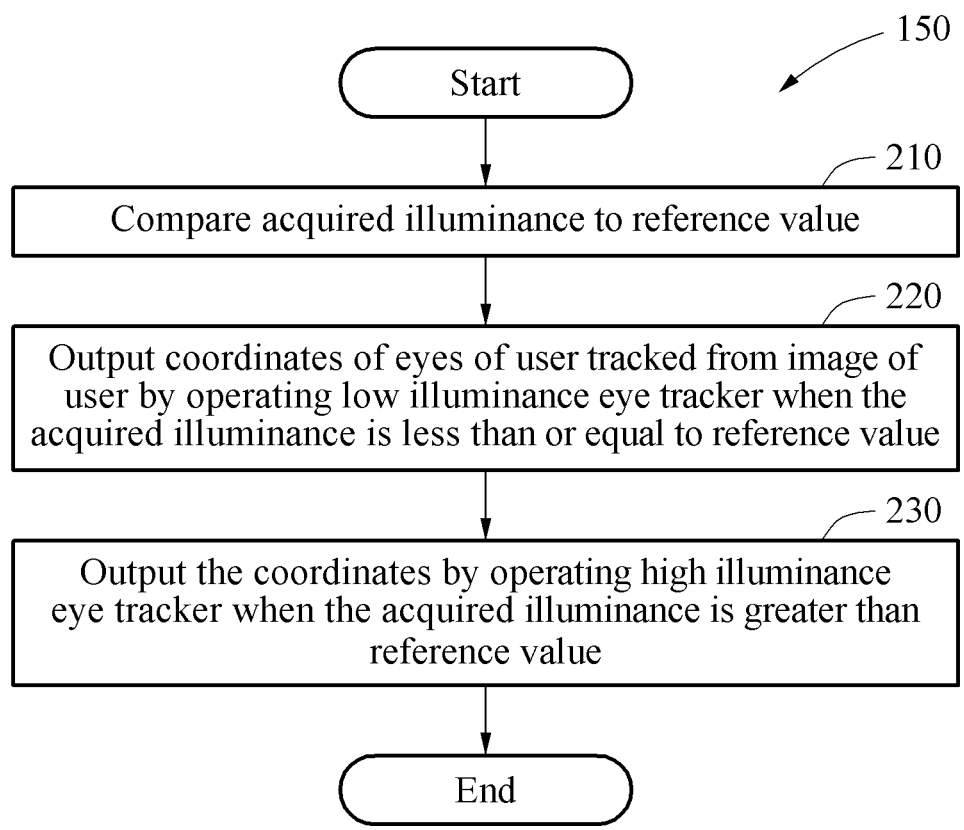
FIG. 2 is a flowchart illustrating an example of an operation of outputting coordinates of eyes of a user in the method of FIG. 1.

FIG. 2 is a flowchart illustrating an example of operation 150 of FIG. 1. Referring to FIG. 2, in operation 210, the tracking apparatus compares the acquired illuminance to a preset reference value. The reference value may be set to, for example, 10 lux.

When the acquired illuminance is less than or equal to the reference value, the tracking apparatus may output the coordinates by operating the low illuminance eye tracker in operation 220. For example, when the acquired illuminance is less than or equal to 10 lux that is the reference value, the tracking apparatus may determine the acquired illuminance as a low illuminance, and may operate the low illuminance eye tracker. The low illuminance eye tracker may be trained by machine learning based on a low illuminance DB including inverse-transform images. The low illuminance eye tracker may process a low illuminance image of a user by a parameter trained by machine learning based on the low illuminance DB, and may output coordinates of eyes of the user.

When the acquired illuminance is greater than the reference value, the tracking apparatus may output the coordinates by operating the high illuminance eye tracker in operation 230. For example, when the acquired illuminance is greater than 10 lux that is the reference value, the tracking apparatus may determine the acquired illuminance as a high illuminance and may operate the high illuminance eye tracker. The high illuminance eye tracker may process a high illuminance image of a user by a parameter trained by machine learning based on the high illuminance DB, and may output coordinates of eyes of the user.

Figure 3:
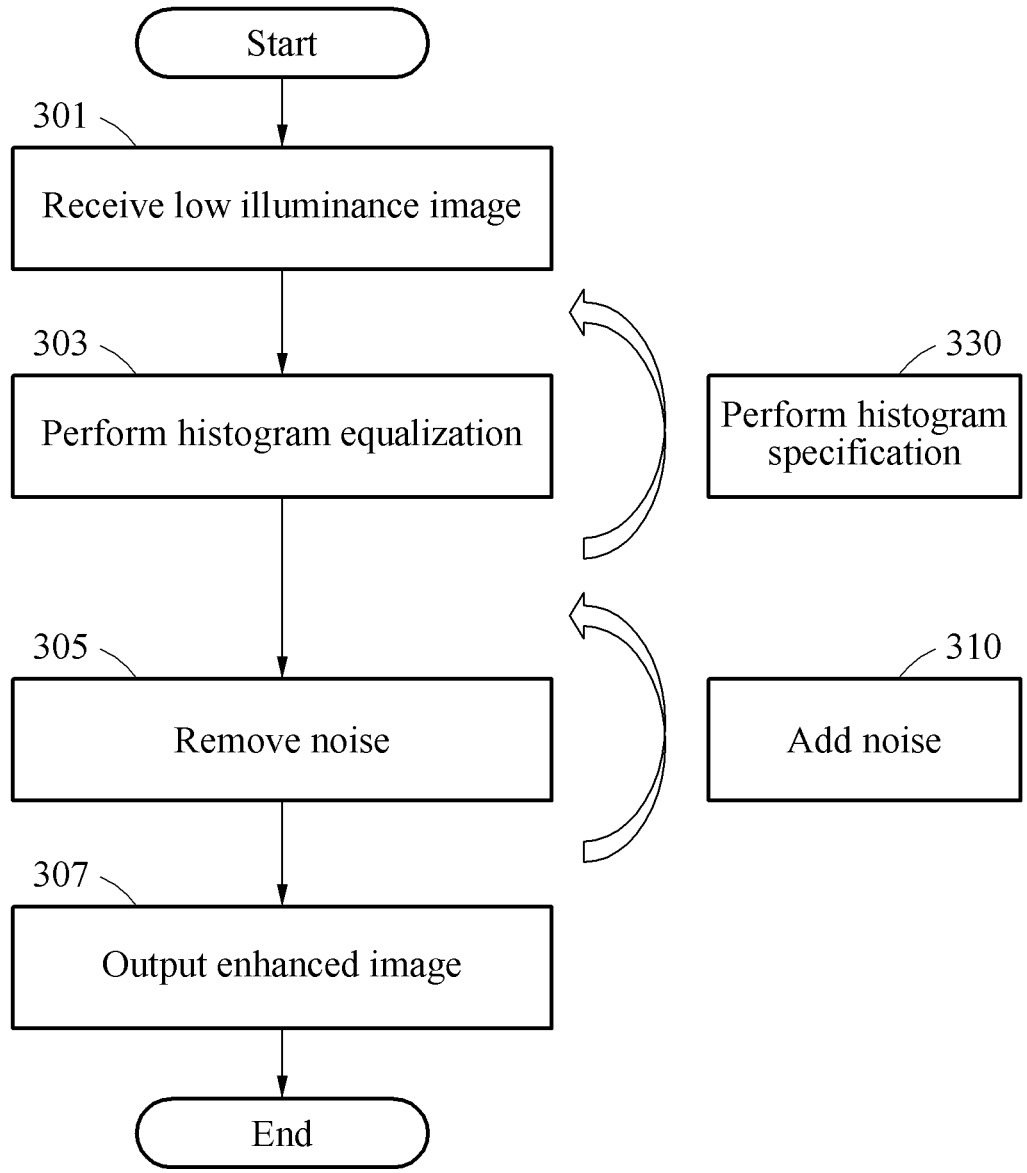
FIG. 3 is a diagram illustrating a concept of a method of generating an inverse-transform image according to an exemplary embodiment.

FIG. 3 is a flow chart illustrating a method of generating an inverse-transform image according to an exemplary embodiment. FIG. 3 illustrates an image enhancement process performed by operations 301, 303, 305 and 307, and a process of generating an inverse-transform image through operations 310 and 330.

An inverse-transform image may be generated by inversely performing the image enhancement process, and accordingly the image enhancement process will be described prior to the process of generating an inverse-transform image.

The image enhancement process may be an image processing scheme to enhance a dark and blurred image or an input unclear image caused by noise to be more suitable image for a special application purpose, to facilitate recognition. The image enhancement process may broadly include operations 301 through 307.

For example, when a low illuminance image is input in operation 301, a histogram equalization to allow the low illuminance image to be clearly viewed may be performed in operation 303. In the histogram equalization, pixel values of an image may be uniformly distributed to fill an entire area of the image by a contrast adjustment so that the image may be clarified. For example, in the histogram equalization, a uniform function or a Gaussian function may be used.

When the histogram equalization is performed, noise may be removed from the low illuminance image in operation 305. In operation 307, an enhanced image, that is, a high illuminance image may be output. The noise may be removed using various noise filters or various algorithms for removing noise, for example, a radiometric correction.

An inverse transformation may be performed by inversely performing a process of generating a high illuminance image from the above-described low illuminance image, to generate a low illuminance image from a high illuminance image.

For example, when the high illuminance image is input, a generation apparatus may add noise to the high illuminance image in operation 310. In this example, the noise may be noise of an average low illuminance image. The noise of the average low illuminance image may be, for example, Gaussian noise or Poisson noise of the average low illuminance image. The Gaussian noise may correspond to general noise with a normal distribution. The Poisson noise may correspond to Poisson distribution noise.

In operation 330, the generation apparatus may perform a histogram specification of the high illuminance image with the noise and may inversely transform the high illuminance image into a low illuminance image. The histogram specification may refer to transformation for matching a histogram of a corresponding image and a predetermined histogram. The generation apparatus may inversely transform the high illuminance image by applying an image histogram characteristic of an image captured at a low illuminance to the high illuminance image. For example, the generation apparatus may transform a histogram of the high illuminance image with the noise so that the histogram of the high illuminance image with the noise may match a histogram of a low illuminance image, and may generate an inverse-transform image from the high illuminance image. An example of a method of configuring a low illuminance DB by generating an inverse-transform image in the generation apparatus will be further described with reference to FIGS. 4 and 5.

A low illuminance image may be generated by inversely transforming a high illuminance image, and thus it is possible to configure a low illuminance DB for training of a low illuminance eye tracker based on high illuminance images stored in a high illuminance DB even though separate low illuminance images are absent.

FIG. 4 is a diagram illustrating a method of generating an inverse-transform image according to an exemplary embodiment. Referring to FIG. 4, a plurality images, for example, a high illuminance image 410, a low illuminance reference image 420, a dark image 430 and an inverse-transform image 440, represent a face of a user. Also, graphs 415, 425, 435 and 445 show image histograms corresponding to the high illuminance image 410 through the inverse-transform image 440, respectively.

The high illuminance image 410 may be a high illuminance image captured at a high illuminance, for example, 450 lux.

The low illuminance reference image 420 may be an image modeled based on low illuminance images captured at a low illuminance, for example, 10 lux.

The dark image 430 may be an image generated by adjusting a brightness level to a low illuminance, for example, 10 lux, in an image histogram of the high illuminance image 410.

The inverse-transform image 440 may be a low illuminance image obtained by inversely transforming the dark image 430 by applying an image histogram characteristic of the low illuminance reference image 420 to the dark image 430.

As described above, an inverse-transform image included in a low illuminance DB according to an exemplary embodiment may be generated by inversely transforming a high illuminance image into a low illuminance image. Hereinafter, a method of inversely transforming a high illuminance image into a low illuminance image will be further described.

A generation apparatus may model the low illuminance reference image 420 based on a plurality of low illuminance images captured at a low illuminance, for example, 10 lux, and may acquire an image histogram characteristic of the low illuminance reference image 420 as shown in the graph 425. The graph 425 corresponds to the image histogram characteristic of the low illuminance reference image 420, and indicates that relatively large number of pixels are concentrated in an intensity less than or equal to "125."

The generation apparatus may generate the dark image 430 from the high illuminance image 410. The generation apparatus may generate the dark image 430 by adjusting the brightness in the image histogram of the high illuminance image 410. For example, the generation apparatus may adjust the brightness to be an intensity less than or equal to "125" by shifting the histogram corresponding to the high illuminance image 410 leftwards in the graph 415, and may generate the dark image 430 corresponding to the graph 435.

The generation apparatus may generate the inverse-transform image 440 by applying the image histogram characteristic of the low illuminance reference image 420 shown in the graph 425 to the dark image 430. An image histogram of the inverse-transform image 440 may be obtained by combining an image histogram characteristic of the dark image 430 and the image histogram characteristic of the low illuminance reference image 420, as shown in the graph 445.

Figure 5:
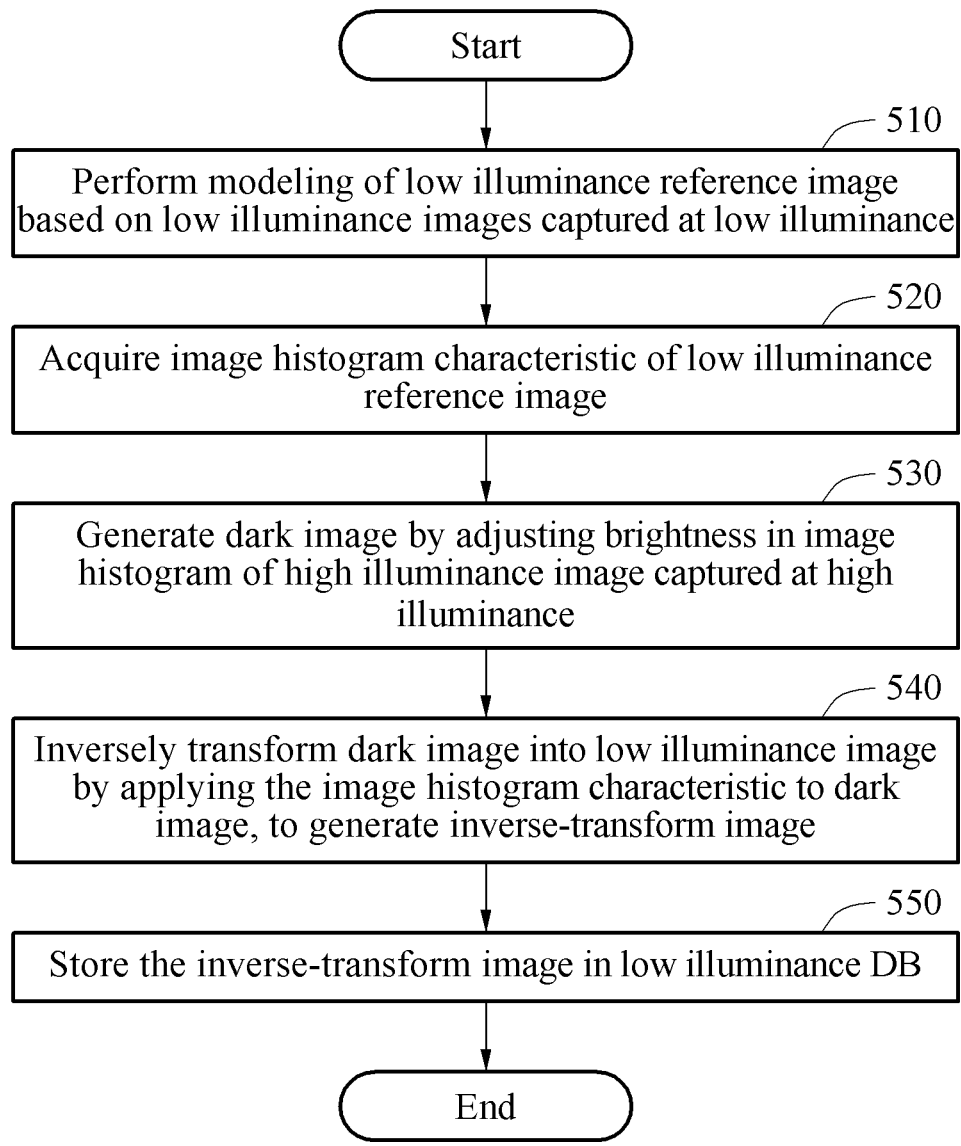
FIG. 5 is a flowchart illustrating a method of generating a low illuminance database (DB) including an inverse-transform image according to an exemplary embodiment.

FIG. 5 is a flowchart illustrating a method of generating a low illuminance DB including an inverse-transform image according to an exemplary embodiment. Referring to FIG. 5, in operation 510, an apparatus for generating a low illuminance DB (hereinafter, referred to as a "generation apparatus") according to an exemplary embodiment performs modeling of a low illuminance reference image based on low illuminance images captured at a low illuminance. For example, the generation apparatus may perform modeling of a low illuminance reference image based on a plurality of low illuminance images captured at 10 lux. The low illuminance reference image may be modeled for each object. For example, the low illuminance reference image may be modeled for different types or for different objects, for example, a human, a cat or a dog. The low illuminance reference image may be modeled as, for example, the low illuminance reference image 420 of FIG. 4.

In operation 520, the generation apparatus acquires an image histogram characteristic of the low illuminance reference image. The image histogram characteristic of the low illuminance reference image may be represented, for example, as shown in the graph 425 of FIG. 4.

In operation 530, the generation apparatus generates a dark image by adjusting a brightness level in an image histogram of a high illuminance image captured at a high illuminance. For example, the generation apparatus may adjust the brightness to be a low illuminance by shifting the image histogram of the high illuminance image, and may generate the dark image.

In operation 540, the generation apparatus inversely transforms the dark image into a low illuminance image by applying the image histogram characteristic of the low illuminance reference image to the dark image, to generate an inverse-transform image.

For example, the generation apparatus may further acquire a noise component of the low illuminance reference image. In this example, the generation apparatus may apply the noise component and the image histogram characteristic of the low illuminance reference image to the dark image generated in operation 530, to inversely transform the dark image into a low illuminance image. The noise component may include, for example, Gaussian noise and Poisson noise of the low illuminance reference image.

In operation 550, the generation apparatus stores the inverse-transform image in the low illuminance DB.

Figure 6:
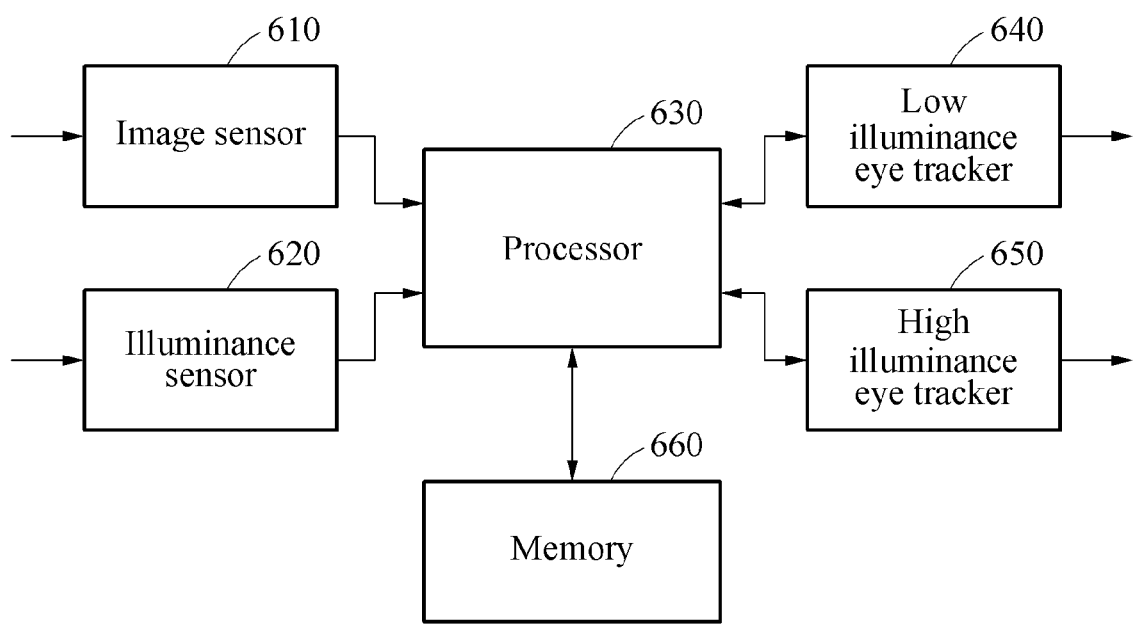
FIG. 6 is a block diagram illustrating an apparatus for tracking eyes of a user according to an exemplary embodiment.

FIG. 6 is a block diagram illustrating a tracking apparatus 600 according to an exemplary embodiment. Referring to FIG. 6, the tracking apparatus 600 includes an image sensor 610, an illuminance sensor 620, a processor 630, a low illuminance eye tracker 640 and a high illuminance eye tracker 650. The tracking apparatus 600 may further include a memory 660.

The image sensor 610 may capture an image of a user.

The illuminance sensor 620 may measure an illuminance of a viewpoint from which the image is captured.

The processor 630 may control coordinates of eyes of the user tracked from the image to be output by operating at least one of the low illuminance eye tracker 640 or the high illuminance eye tracker 650 based on the measured illuminance.

Also, the processor 630 may perform at least one of the methods described above with reference to FIGS. 1 through 5. According to an exemplary embodiment, the processor 630 may perform the functions of the generation apparatus illustrated with respect to FIGS. 3, 4 and 5. The processor 630 may execute a program and may control the tracking apparatus 600. A program code executed by the processor 630 may be stored in the memory 660.

The low illuminance eye tracker 640 may operate at a low illuminance, to track positions of the eyes from the image and to output coordinates of the eyes. The low illuminance eye tracker 640 may be trained by machine learning based on a low illuminance DB including inverse-transform images obtained by inversely transforming high illuminance images. For example, the low illuminance DB may include inverse-transform images generated by applying, to high illuminance images, an image histogram characteristic of a low illuminance reference image modeled in advance based on low illuminance images captured at a low illuminance. Also, the low illuminance DB may include inverse-transform images generated by applying, to high illuminance images, a noise component of the low illuminance reference image in addition to the image histogram characteristic of the low illuminance reference image.

The high illuminance eye tracker 650 may operate at a high illuminance, to track positions of the eyes from the image and to output coordinates of the eyes. The high illuminance eye tracker 650 may be trained by machine learning based on a high illuminance DB including high illuminance images captured at the high illuminance.

The memory 660 may store the image captured by the image sensor 610 and/or the coordinates of the eyes output by the low illuminance eye tracker 640 and the high illuminance eye tracker 650. The memory 660 may include the low illuminance DB and the high illuminance DB depending on example embodiments.

Also, the memory 660 may store a variety of information generated in the above-described processing process of the processor 630. Furthermore, the memory 660 may store a variety of data and programs. The memory 660 may include, for example, a volatile memory or a nonvolatile memory. The memory 660 may include a mass storage medium, for example, a hard disk, to store a variety of data.

Figure 7:
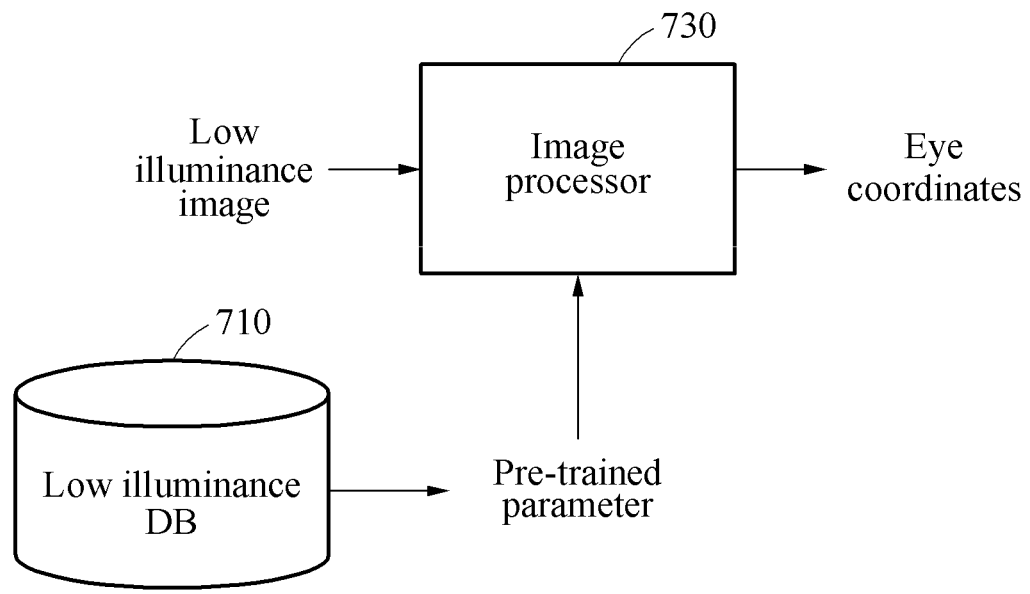
FIG. 7 is a block diagram illustrating a low illuminance eye tracker according to an exemplary embodiment.

FIG. 7 is a block diagram illustrating a low illuminance eye tracker 700 according to an exemplary embodiment. Referring to FIG. 7, the low illuminance eye tracker 700 includes a low illuminance DB 710 and an image processor 730.

The low illuminance DB 710 may include inverse-transform images obtained by inversely transforming high illuminance images. For example, the low illuminance DB 710 may include inverse-transform images generated by applying, to high illuminance images, an image histogram characteristic of a low illuminance reference image modeled in advance based on low illuminance images captured at a low illuminance. Also, the low illuminance DB 710 may include inverse-transform images generated by applying, to high illuminance images, a noise component of the low illuminance reference image in addition to the image histogram characteristic of the low illuminance reference image. The low illuminance DB 710 may be included in, for example, a memory (not shown).

The image processor 730 may process a low illuminance image of a user by a parameter trained in advance by machine learning based on the low illuminance DB 710, and may output coordinates of eyes of the user. For example, the coordinates output by the image processor 730 may be directly used as an input of a glasses-free 3D display.

Also, the image processor 730 may perform at least one of the methods described above with reference to FIGS. 3, 4 and 5. The image processor 730 may execute a program and may control the low illuminance eye tracker 700. According to an exemplary embodiment, the processor 730 may perform the functions of the generation apparatus illustrated with respect to FIGS. 3, 4 and 5. A program code executed by the low illuminance eye tracker 700 may be stored in a memory.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of tracking eyes of an object, the method comprising:
    acquiring an image of the object;
    acquiring an illuminance of a viewpoint from which the image is captured; and
    outputting coordinates of the eyes tracked from the image by operating at least one of a first illuminance eye tracker that operates at a first illuminance range or a second illuminance eye tracker that operates at a second illuminance range based on the acquired illuminance.

2. The method of claim 1, wherein
    the first illuminance eye tracker is trained by machine learning based on a first illuminance database (DB) comprising first illuminance images captured at the first illuminance range, and
    the second illuminance eye tracker is trained by machine learning based on a second illuminance DB comprising inverse-transform images obtained by inversely transforming the first illuminance images into second illuminance images.

3. The method of claim 2, wherein the inverse-transform images comprise feature points trained by the machine learning based on the first illuminance DB.

4. The method of claim 2, wherein the second illuminance DB comprises the inverse-transform images generated by applying, to the first illuminance images, an image histogram characteristic of a second illuminance reference image modeled in advance based on second illuminance images captured at a second illuminance range.

5. The method of claim 4, wherein the second illuminance DB comprises the inverse-transform images generated by applying, to the first illuminance images, a noise component of the second illuminance reference image in addition to the image histogram characteristic.

6. The method of claim 1, wherein each of the first illuminance eye tracker and the second illuminance eye tracker comprises a plurality of classifiers configured to recognize feature points corresponding to the eyes of the object from the image.

7. The method of claim 1, wherein the outputting of the coordinates comprises:
    comparing the acquired illuminance to a reference value;
    outputting the coordinates by operating the second illuminance eye tracker when the acquired illuminance is less than or equal to the reference value; and
    outputting the coordinates by operating the first illuminance eye tracker when the acquired illuminance is greater than the reference value.

8. The method of claim 7, wherein the reference value is set to 10 lux.

9. The method of claim 1, wherein the acquiring of the image comprises capturing the image using a single image sensor.

10. A non-transitory computer-readable storage medium storing a program for causing a processor to perform the method of claim 1.

11. The method of claim 1, wherein the first illuminance range has a higher illuminance value than a second illuminance range.

12. The method of claim 1, wherein the first illuminance eye tracker is a high illuminance eye tracker and the second illuminance eye tracker is a low illuminance eye tracker, the high illuminance eye tracker is different from the low illuminance eye tracker and the high illuminance eye tracker operates at a higher illuminance value than the low illuminance eye tracker.

13. The method of claim 1, wherein the coordinates of the eyes tracked from the image are output by operating the first illuminance eye tracker based on the acquired illuminance being equal to or greater than a threshold value, and the coordinates of the eyes tracked from the image are output by operating the second illuminance eye tracker based on the acquired illuminance being lower than the threshold value.

14. A method of generating an inverse-transform image, the method comprising:
- modeling a first illuminance reference image based on first illuminance images captured at a first illuminance;
- acquiring an image histogram characteristic of the first illuminance reference image;
- generating an intermediate image by adjusting a brightness level in an image histogram of a second illuminance image captured at a second illuminance; and
- inversely transforming the intermediate image into a first illuminance image by applying the image histogram characteristic to the intermediate image.

15. The method of claim 14, further comprising:
- acquiring a noise component of the first illuminance reference image,
- wherein the inversely transforming of the intermediate image comprises inversely transforming the intermediate image into the first illuminance image by applying the noise component and the image histogram characteristic to the intermediate image.

16. The method of claim 14, wherein the noise component comprises at least one of Gaussian noise of the first illuminance reference image or Poisson noise of the first illuminance reference image.

17. An apparatus for tracking eyes of an object, the apparatus comprising:
- an image sensor configured to capture an image of the object;
- an illuminance sensor configured to measure an illuminance of a viewpoint from which the image is captured;
- a first illuminance eye tracker configured to operate at a first illuminance range;
- a second illuminance eye tracker configured to operate at a second illuminance range; and
- a processor configured to control coordinates of the eyes tracked from the image to be output by operating at least one of the first illuminance eye tracker or the second illuminance eye tracker based on the measured illuminance.

18. The apparatus of claim 17, wherein
- the first illuminance eye tracker is trained by machine learning based on a first illuminance database (DB) comprising first illuminance images captured at the first illuminance range, and
- the second illuminance eye tracker is trained by machine learning based on a second illuminance DB comprising inverse-transform images obtained by inversely transforming the first illuminance images into second illuminance images.

19. The apparatus of claim 18, wherein the second illuminance DB comprises the inverse-transform images generated by applying, to the first illuminance images, an image histogram characteristic of a second illuminance reference image modeled in advance based on second illuminance images captured at a second illuminance range.

20. The apparatus of claim 19, wherein the second illuminance DB comprises the inverse-transform images generated by applying, to the first illuminance images, a noise component of the second illuminance reference image in addition to the image histogram characteristic.

21. An illuminance eye tracker comprising:
- an illuminance database (DB) comprising inverse-transform images obtained by inversely transforming first images having a first illuminance into second images having a second illuminance; and
- an image processor configured to process an image of an object by a parameter trained by machine learning based on the illuminance DB, and to output coordinates of eyes of the object based on the processing of the image of the object, wherein the first illuminance is different from the second illuminance.

22. The illuminance eye tracker of claim 21, wherein the illuminance DB comprises the inverse-transform images generated by applying, to the first images, an image histogram characteristic of a reference image of the second illuminance modeled in advance based on the second images captured at a range of the second illuminance.

23. The illuminance eye tracker of claim 22, wherein the illuminance DB comprises the inverse-transform images generated by applying, to the first images, a noise component of the reference image of the second illuminance in addition to the image histogram characteristic.

* * * * *